(12) United States Patent
Worden et al.

(10) Patent No.: US 11,884,223 B2
(45) Date of Patent: Jan. 30, 2024

(54) GROUND VEHICLE BUMPER SYSTEM

(71) Applicant: Google LLC, Mountain View, CA (US)

(72) Inventors: Nathanael Arling Worden, Mill Creek, WA (US); Michael John Hector, Seattle, WA (US)

(73) Assignee: Google LLC, Mountain View, CA (US)

( * ) Notice: Subject to any disclaimer, the term of this patent is extended or adjusted under 35 U.S.C. 154(b) by 69 days.

(21) Appl. No.: 17/457,122

(22) Filed: Dec. 1, 2021

(65) Prior Publication Data
US 2023/0166681 A1   Jun. 1, 2023

(51) Int. Cl.
B60R 19/28 (2006.01)
B60R 19/48 (2006.01)
B60R 19/42 (2006.01)

(52) U.S. Cl.
CPC .......... B60R 19/483 (2013.01); B60R 19/28 (2013.01); B60R 19/42 (2013.01)

(58) Field of Classification Search
CPC ....... B60R 19/483; B60R 19/42; B60R 29/28; B60R 19/30
USPC .................... 293/4, 126, 127, 135, 136, 137
See application file for complete search history.

(56) References Cited

U.S. PATENT DOCUMENTS

| | | | |
|---|---|---|---|
| 4,397,372 A | 8/1983 | De Kraker | |
| 5,163,273 A * | 11/1992 | Wojtkowski | B60L 58/21 |
| | | | 180/211 |
| 5,582,496 A * | 12/1996 | Ambrico | F16B 39/12 |
| | | | 411/932 |
| 9,278,690 B2 | 3/2016 | Smith | |
| 9,902,069 B2 * | 2/2018 | Farlow | B25J 11/009 |
| 10,391,630 B2 | 8/2019 | Fong et al. | |
| 11,104,006 B2 | 8/2021 | Fay et al. | |

(Continued)

FOREIGN PATENT DOCUMENTS

| | | | | |
|---|---|---|---|---|
| CN | 106427444 | | 2/2017 | |
| CN | 111002937 A | * | 4/2020 | ............ B60R 19/42 |

(Continued)

OTHER PUBLICATIONS

Extended European Search Report in European Appln. No. 22189004.9, dated Jun. 16, 2023, 8 pages.

*Primary Examiner* — Amy R Weisberg
*Assistant Examiner* — Sara Laghlam
(74) *Attorney, Agent, or Firm* — Fish & Richardson P.C.

(57) ABSTRACT

A vehicle includes a body having a first outer periphery in a first plane parallel to a surface on which the vehicle moves in a horizontal direction; a bumper assembly having a second outer periphery in a second plane parallel to the first plane and including portions that extend beyond the first outer periphery; one or more flexible couplings coupling the bumper assembly to the body and allowing for horizontal planar deflection of the bumper assembly relative to the body when the bumper assembly impacts an obstacle; one or more sensors mounted to detect planar deflection of the bumper assembly and being configured to generate signals indicating the bumper assembly has deflected at least a threshold amount; and a drive system configured to propel the vehicle and, in response to the signals indicating the bumper assembly has deflected at least a threshold amount, cause the vehicle to stop moving.

17 Claims, 6 Drawing Sheets

(56) References Cited

U.S. PATENT DOCUMENTS

| | | | |
|---|---|---|---|
| 11,685,053 B1 * | 6/2023 | Ebrahimi Afrouzi | ....................... B25J 11/0085 15/319 |
| 2008/0281470 A1 | 11/2008 | Gilbert, Jr. et al. | |
| 2014/0090201 A1 * | 4/2014 | Gilbert, Jr. | ............ A47L 11/408 15/98 |
| 2017/0037928 A1 * | 2/2017 | Kronkright | ........... F16F 13/005 |
| 2017/0182924 A1 | 6/2017 | Lendo et al. | |
| 2017/0188510 A1 * | 7/2017 | Einecke | ................. H04N 7/183 |
| 2019/0004161 A1 * | 1/2019 | Ueda | ..................... G01S 15/931 |
| 2019/0367242 A1 * | 12/2019 | Kronkright | ............ B65D 81/07 |

FOREIGN PATENT DOCUMENTS

| | | | | |
|---|---|---|---|---|
| CN | 111002938 A | * | 4/2020 | |
| TW | 201127683 | | 8/2011 | |
| WO | WO-2019107003 A1 | * | 6/2019 | ......... B60R 11/0247 |

* cited by examiner

GROUND VEHICLE BUMPER SYSTEM

TECHNICAL FIELD

This specification relates generally to safety systems for automatic guided vehicles.

BACKGROUND

Automatic Guided Vehicle (AGV) systems use various obstacle detection devices, such as collapsible contact bumpers. These bumpers are instrumented to trigger a safety stop if they collide with an obstacle. If an AGV collides with an object, the safety stop can prevent or mitigate damage to the AGV and the obstacle. Bumper activation causes a safety stop within the collapsible range of the bumper and before the vehicle strikes the obstacle. Collapsible contact bumpers typically have large radii and/or edges with shallow angles, and are challenging to integrate into AGVs with rounded or complex shapes.

SUMMARY

Disclosed are systems for ground vehicle bumper systems. The disclosed systems can be implemented to detect collisions of ground vehicles, such as AGVs, by sensing the motion of a bumper mounted to a frame of the vehicle body. The bumper is a single rigid bumper mounted to the frame via a compliant mechanism. The single bumper deflects upon experiencing a collision, and springs back to a neutral position after being deflected.

The disclosed system can be used to reduce the likelihood of damage to vehicles and obstacles. Deflection of the bumper can be monitored by sensors and a controller. The sensors can be configured to detect deflection of the bumper and output signals to the controller indicating the deflection. The controller can stop movement of the vehicle in response to receiving the signals. The controller can stop movement of the vehicle by outputting a vehicle stop command to a drive system of the vehicle.

Sensing the motion of a rigid bumper allows for complex shaped bumper edges. The bumper can have any shape, such that at least a portion of the bumper extends beyond the periphery of the vehicle body in the plane of motion of the vehicle. This approach can be used to create an AGV safety bumper that has high flexibility in shape, stiffness, and travel distance.

In general, one innovative aspect of the subject matter described in this specification can be embodied in a vehicle including a body having a first outer periphery in a first plane that is parallel to a surface on which the vehicle moves in a horizontal direction; a bumper assembly having a second outer periphery in a second plane parallel to the first plane, the second outer periphery including portions that extend beyond the first outer periphery in the horizontal direction; one or more flexible couplings coupling the bumper assembly to the body, the one or more flexible couplings allowing for horizontal planar deflection of the bumper assembly relative to the body when the bumper assembly impacts an obstacle when the vehicle is moving in the horizontal direction; one or more sensors mounted relative to the bumper assembly and to the body to detect horizontal planar deflection of the bumper assembly, the one or more sensors being configured to generate signals indicating the bumper assembly has deflected in the horizontal planar direction at least a threshold amount; and a drive system configured to propel the vehicle in the horizontal direction and that receives, as input, the signals generated by the one or more sensors and in response to the signals indicating the bumper assembly has deflected in the horizontal planar direction at least a threshold amount, causes the vehicle to stop moving in the horizontal planar direction.

The foregoing and other embodiments can each optionally include one or more of the following features, alone or in combination. In some implementations, the one or more sensors each include a proximity sensor.

In some implementations, a sensing face of the proximity sensor is mounted to the body; and a target of the proximity sensor is mounted to the bumper assembly so that the sensing face and target are in operative disposition from each other.

In some implementations, when the target is not within a specified proximity to the sensing face, the proximity sensor generates the signals indicating the bumper assembly has deflected in the horizontal planar direction at least a threshold amount.

In some implementations, each of the one or more flexible couplings are in a neutral position in the horizontal direction when the bumper assembly is not in horizontal planar deflection, and apply a restorative force when the bumper assembly is in horizontal planar deflection that causes the bumper assembly to force toward the neutral position.

In some implementations, the one or more flexible couplings allows for vertical deflection of the bumper assembly relative to the body.

In some implementations, the one or more flexible couplings each apply a restorative force to the bumper assembly in the vertical direction, the restorative force causing the bumper assembly to return to a neutral vertical position after a vertical deflection.

In some implementations, each of the one or more flexible couplings includes an extension spring, an axis of the extension spring extending in a direction orthogonal to the horizontal direction.

In some implementations, a first end of the extension spring is coupled to the bumper assembly and a second end of the extension spring is coupled to the body.

In some implementations, the first end of the extension spring is coupled to a horizontal surface of the bumper assembly by a threaded plug.

In some implementations, the one or more flexible couplings each includes a wire rope isolator having first and second attachment plates. A first attachment plate of the wire rope isolator is coupled to the bumper assembly and a second attachment plate of the wire rope isolator is coupled to the body.

In some implementations, the vehicle is an autonomous ground vehicle.

In general, one innovative aspect of the subject matter described in this specification can be embodied in a bumper system for a vehicle, including: a bumper assembly having a first outer periphery in a first horizontal plane; and a plurality of attachment points on the bumper assembly that are positioned to mount the bumper assembly to a vehicle body having a second outer periphery in a second horizontal plane that is parallel to the first horizontal plane. The second horizontal plane is parallel to a surface on which the vehicle moves in a horizontal direction. The bumper assembly includes a plurality of flexible couplings that are coupled to the attachment points are configured to be attached to vehicle attachment points of the vehicle body to mount the bumper assembly to the vehicle body and allow for horizontal planar deflection of the bumper assembly relative to the vehicle body when the bumper assembly impacts an obstacle when the vehicle body is moving in the horizontal direction. The first outer periphery of the bumper assembly, when the bumper assembly is attached to the vehicle body by the flexible couplings, includes portions that extend beyond the second outer periphery in the horizontal direction.

The foregoing and other embodiments can each optionally include one or more of the following features, alone or in combination. In some implementations, the bumper system includes: one or more sensors including a first portion mounted to the bumper assembly and a second portion mounted to the vehicle body in operative disposition to the first portion, the one or more sensors being configured to detect horizontal planar deflection of the bumper assembly relative to the vehicle body when the bumper assembly impacts an obstacle when the vehicle is moving in the horizontal planar direction and to generate signals indicating the bumper assembly has deflected in the horizontal planar direction at least a threshold amount; and a controller configured to receive, as input, the signals generated by the one or more sensors and in response to the signals indicating the bumper assembly has deflected in the horizontal planar direction, control a drive system of the vehicle to cause the vehicle to stop moving in the horizontal planar direction.

In some implementations, the one or more sensors each include a proximity sensor.

In some implementations, the second portion of each of the one or more proximity sensors includes a sensing face mounted to the vehicle body; and the first portion of each of the one or more proximity sensors includes a target mounted to the bumper assembly so that the sensing face and the target are in operative disposition to each other.

In some implementations, when the target is not within a specified proximity to the sensing face, the proximity sensor generates the signals indicating the bumper assembly has deflected in the horizontal planar direction at least a threshold amount.

In some implementations, the plurality of flexible couplings are in a neutral position in the horizontal direction when the bumper assembly is not in horizontal planar deflection, and apply a restorative force when the bumper assembly is in horizontal planar deflection that causes the bumper assembly to force toward the neutral position.

In some implementations, the plurality of flexible couplings allow for vertical deflection of the bumper assembly relative to the body.

In some implementations, the one or more flexible couplings each apply a restorative force to the bumper in the vertical direction, the restorative force causing the bumper to return to a neutral vertical position after a vertical deflection.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
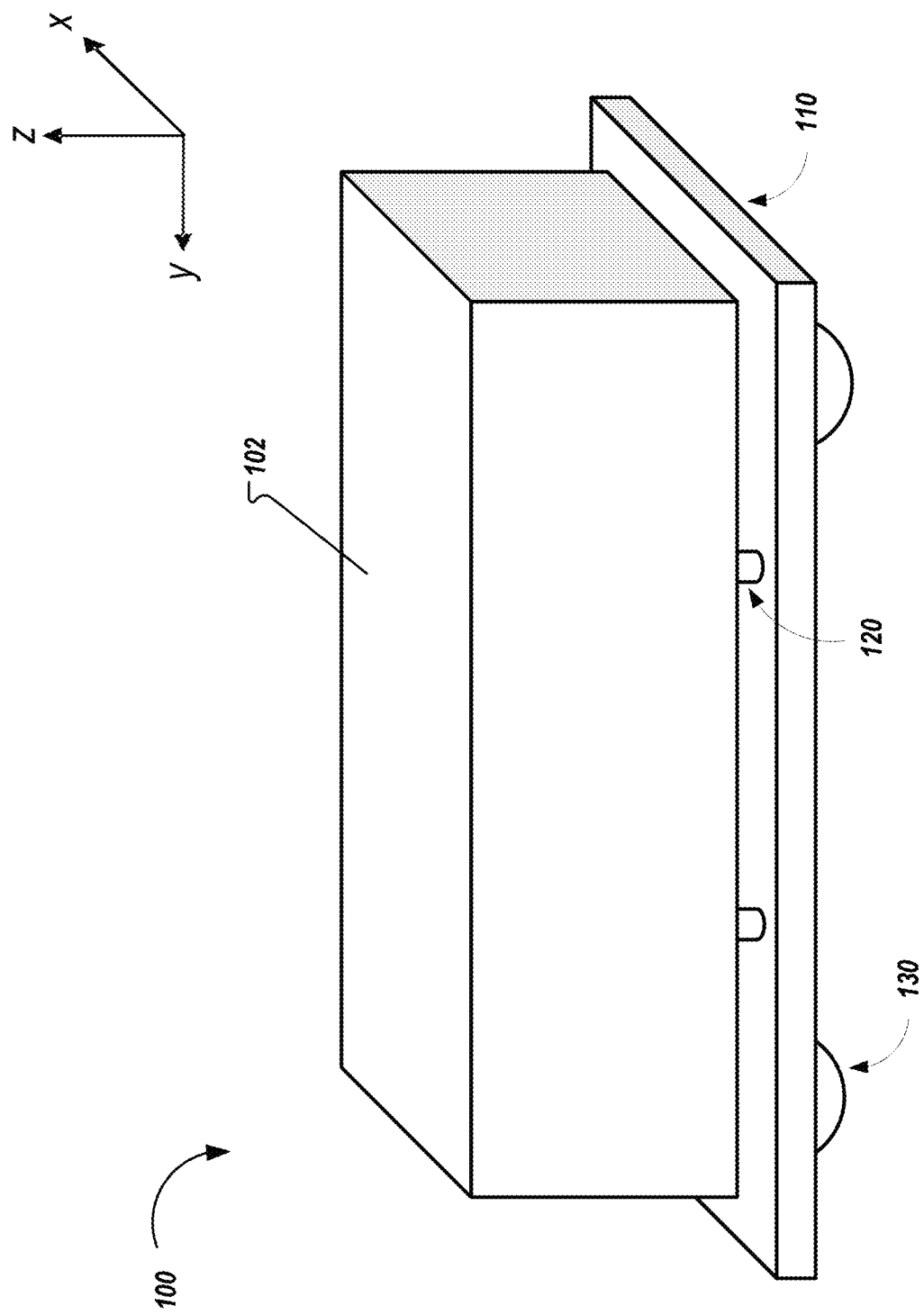
FIG. 1 illustrates an example ground vehicle system including a bumper assembly.

FIG. 1 illustrates an example ground vehicle system including a bumper assembly. The ground vehicle system ("vehicle 100") can be, for example, an automated guided vehicle (AGV). The vehicle 100 includes a body 102 and a bumper assembly 110. The body 102 is coupled to the bumper assembly 110 by flexible couplings 120.

The vehicle 100 includes movement mechanisms, e.g., wheels 130. A drive system is operable to drive the wheels 130 to propel the vehicle 100 along the surface 104. The drive system is also operable to turn the wheels 130 to change the direction of movement of the vehicle 100, and to stop the wheels to stop movement of the vehicle 100. In some examples, the wheels include castor wheels.

Although shown as having wheels 130, the vehicle 100 can include any appropriate type of movement mechanisms. For example, the movement mechanisms can include treads, legs, skis, etc. The vehicle 100 can move by any means of ground locomotion. For example, the vehicle can walk, roll, slither. In some examples, the vehicle 100 can include multiple different types of movement mechanisms, and can move by multiple different means of locomotion.

FIG. 1 includes a three-dimensional coordinate axis for reference. The x and y directions define a horizontal plane. The AGV moves in a horizontal direction along a surface 104. The z direction defines a vertical plane that extends in the direction of gravity.

In the example of FIG. 1, the bumper assembly 110 is positioned such that the bumper assembly 110 is in a downward direction of gravity relative to the body 102. In some examples, the bumper assembly 110 can be positioned such that the body 102 is in a downward direction of gravity relative to the bumper assembly 110. In some examples, the body 102 and the bumper assembly 110 can be at least partially aligned or overlapping with each other in the x-y plane.

The bumper assembly 110 is a single rigid component of the vehicle system. In some examples, the bumper assembly 110 can be formed from a polycarbonate material. Portions of the bumper assembly 110 that correspond to each side of the vehicle can be contiguous with portions of the bumper assembly 110 that correspond with each other side of the bumper assembly. For example, portions of the bumper assembly 110 that correspond to the front side of the vehicle can be contiguous with portions of the bumper assembly 110 that corresponds to a rear side of the vehicle.

Figure 3A:
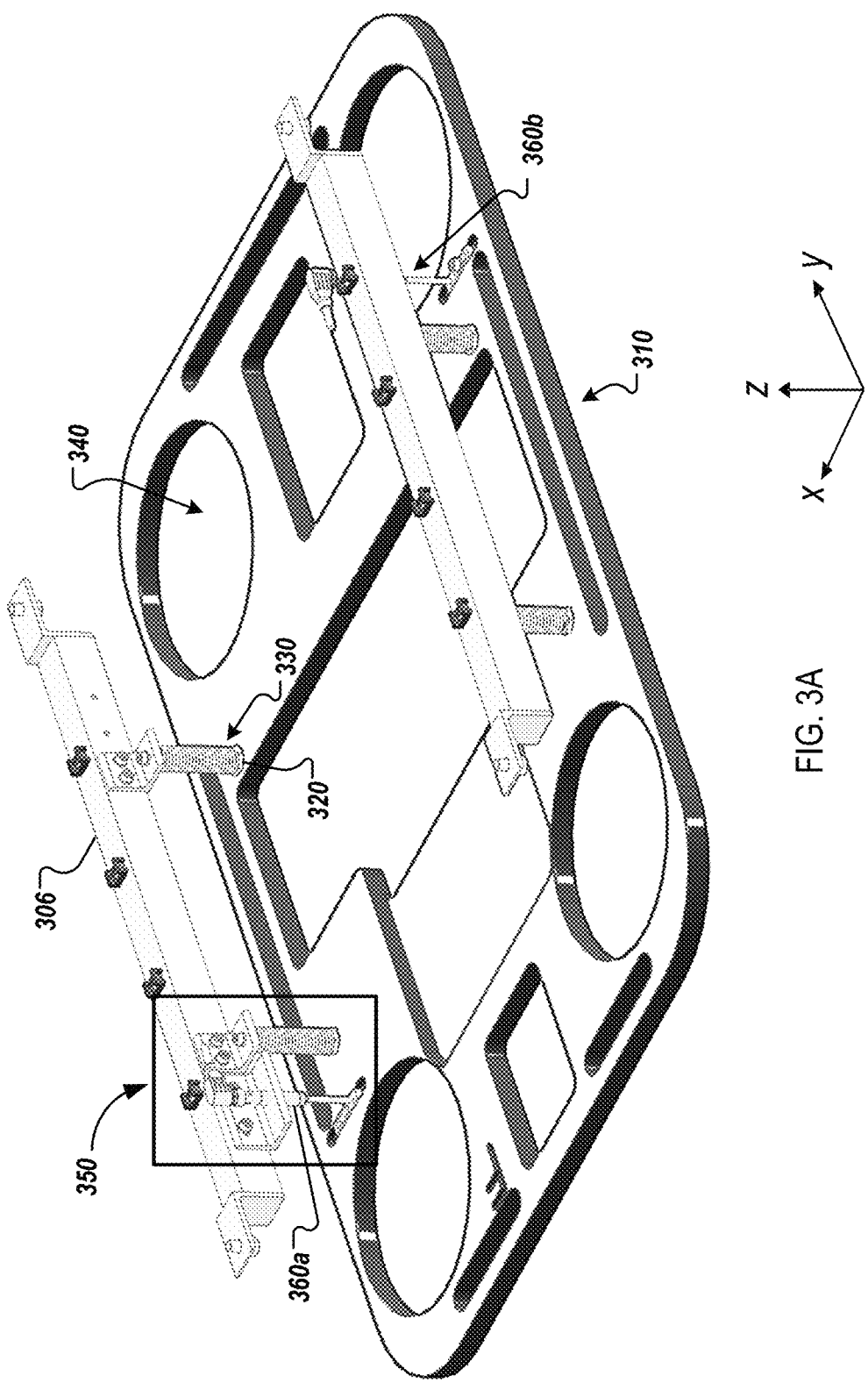
FIG. 3A illustrates a perspective view of an example bumper assembly.

The bumper assembly 110 can include cutouts 340, as shown in FIG. 3A. The cutouts 340 can have any shape, e.g., rounded or polygonal. The cutouts 340 can be arranged to permit components of the vehicle system to pass through the bumper assembly 110. For example, the wheels 130 can be coupled to the body 101 and can pass through the cutouts 340 in order to contact the surface 150. In some examples, the cutouts 340 can be formed in the bumper assembly 110 in order to reduce weight of the bumper assembly 110. In some examples, the cutouts 340 can be formed in the bumper assembly 110 to enable sensors to view the surface 150. For example, sensors such as cameras, LIDAR sensors, and acoustics sensors can be mounted to the body 102. The sensors can transmit or receive electromagnetic energy and/or acoustic energy through the cutouts 340 to aid in navigating the vehicle.

The bumper assembly 110 is connected to a frame of the body 102 of the vehicle by a compliant mount. The compliant mount includes flexible couplings 120 that mechanically couple the bumper assembly 110 to the body 102. The flexible couplings 120 allow for horizontal planar deflection of the bumper assembly 110 relative to the body 102 when the bumper assembly 110 impacts an obstacle when the vehicle is moving in the horizontal direction. The flexible couplings 120 allow the bumper assembly 110 to be deflected relative to the body 102 in all horizontal directions of travel. For example, the bumper assembly 110 can be deflected in the x-direction, in the y-direction, and in a direction diagonal to the x and y-directions. The compliant mount allows the entire bumper assembly 110 to shift in shear in any direction when the bumper assembly 110 impacts an obstacle, and to return to neutral.

The vehicle 100 includes one or more sensors mounted relative to the bumper assembly 110 and to the body to detect horizontal planar deflection of the bumper assembly. When the bumper assembly 110 deflects by at least a threshold amount, the sensors generate a signal indicating that the bumper assembly 110 has deflected by at least the threshold amount. The deflection of the bumper assembly by at least the threshold amount can indicate an impact or collision with an obstacle. Operations of the sensors are described in greater detail with reference to FIGS. 3A and 3B.

The drive system receives, as input, the signals output by the sensors. In response to signals indicating the bumper assembly 110 has deflected in the horizontal planar direction at least a threshold amount, the drive system causes the vehicle to stop moving in the horizontal planar direction. For example, the drive system can stop rotation of the wheels 130 by cutting power to the wheels 130 and/or by applying brakes to the wheels 130.

Figures 2A, 2B:
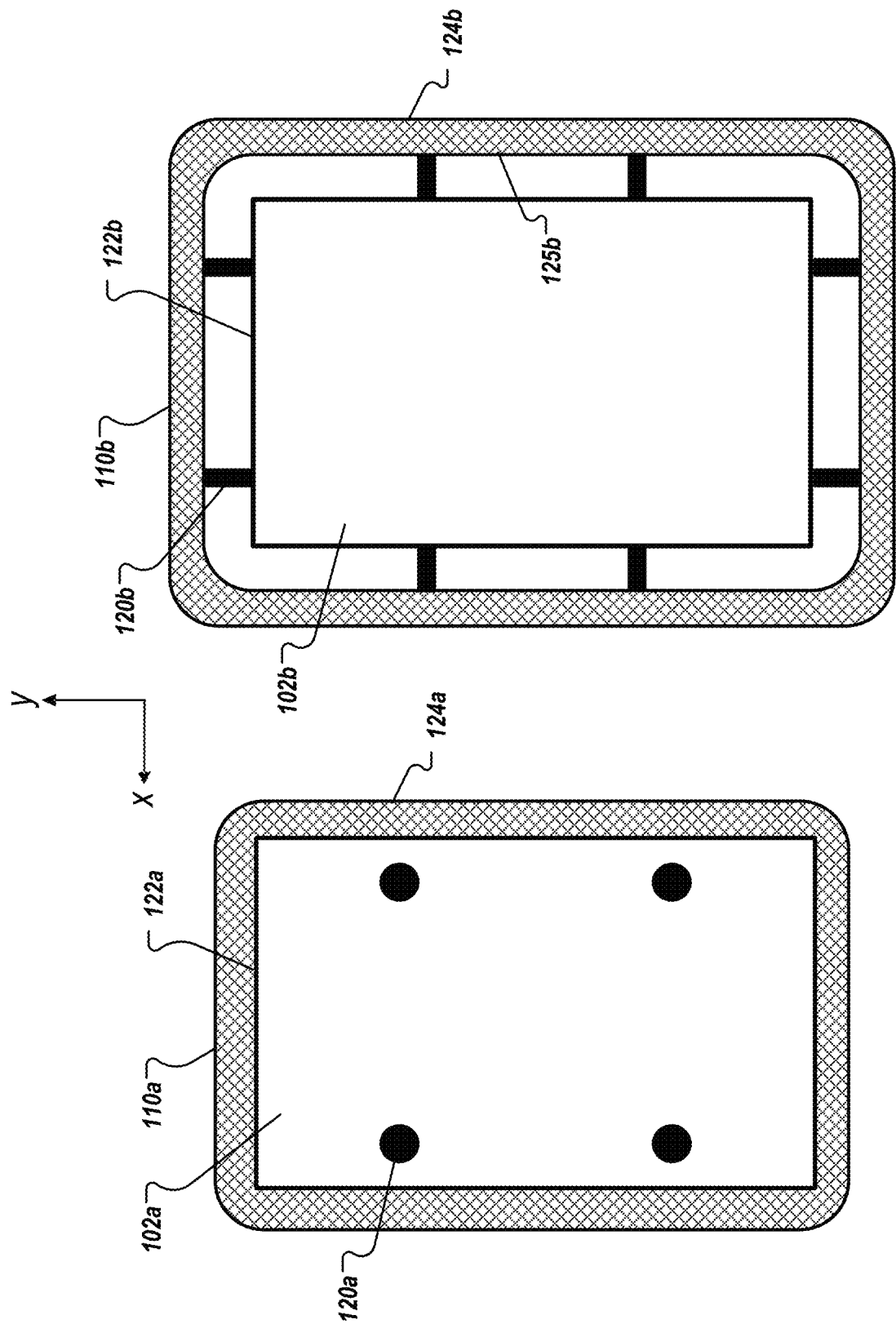
FIG. 2A illustrates an overhead view of an example ground vehicle system including a bumper assembly with vertically oriented coupling assemblies.
FIG. 2B illustrates an overhead view of an example ground vehicle system including a bumper assembly with horizontally oriented coupling assemblies.

FIG. 2A illustrates an overhead cross-sectional view of an example ground vehicle system including a bumper assembly 110a with vertically oriented coupling assemblies. The vehicle 100a includes body 102a, bumper assembly 110a, and flexible couplings 120a. The body 102a has a first outer periphery 122a in the horizontal plane, e.g., the x-y plane that is horizontal to the surface 104.

The bumper assembly 110a has a second outer periphery 124a in a second plane parallel to the first plane. The second outer periphery 124a includes portions that extend beyond the first outer periphery 122a in the horizontal direction. In some examples, as shown in FIG. 2A, all portions of the second outer periphery 124a extend beyond the first outer periphery 122a. In some examples, only some portions of the second outer periphery 124a extend beyond the first outer periphery 122a. As an example, the vehicle 100a may have a front side and a rear side, and the second outer periphery 124a may extend beyond the first outer periphery 122a only on the front side.

The portions of the bumper assembly that extend beyond the first outer periphery 122a can extend beyond the first outer periphery 122a by, e.g., a quarter inch, a half inch, three quarters of an inch, or an inch. In some examples, a first portion of the bumper assembly that extends beyond the first outer periphery 122a extends beyond the first outer periphery 122a by a greater amount than a second portion of the bumper assembly that extends beyond the first outer periphery 122a. For example, a portion of the bumper assembly that corresponds to a front of the body may extend beyond the first outer periphery 122a by three quarters of an inch, while a portion of the bumper assembly that corresponds to a rear of the body may extend beyond the first outer periphery 122a by a half inch.

The bumper assembly 110a is coupled to the body 102a by four flexible couplings 120a. The flexible couplings extend vertically in the z-direction from the bumper assembly 110a to the body 102. For example, the flexible couplings can include extension springs that are mounted such that an axis of the extension springs extends along the z-direction. The flexible couplings 120a are described in greater detail with reference to FIGS. 3 and 4.

FIG. 2B illustrates an overhead view of an example ground vehicle system including a bumper assembly 110b with horizontally oriented coupling assemblies. The vehicle 100b includes body 102b, bumper assembly 110b, and flexible couplings 120b that extend outward from the body 102b. The body 102b has a first outer periphery 122b in the horizontal plane, e.g., the x-y plane that is horizontal to the 104.

The bumper assembly 110b has a second outer periphery 124b in a second plane parallel to the first plane. The second outer periphery 124b includes portions that extend beyond the first outer periphery 122b in the horizontal direction. The bumper assembly 110b has an inner periphery 125b. The inner periphery 125b of the bumper assembly 110b surrounds the first outer periphery 122b of the body 102b.

The bumper assembly 110b is coupled to the body 102 by six flexible couplings 120a. The flexible couplings extend horizontally in the x-y direction from the bumper assembly 110b to the body 102. For example, the flexible couplings can include extension springs that are mounted such that an axis of each of the extension springs extends along the x-direction or the y-direction. In some examples, a first end of each coupling assembly couples to the inner periphery 125b, and a second end of each coupling assembly couples to the first outer periphery 122b.

Although shown as having a rounded rectangular shape in the x-y plane, the bumper assemblies 110a, 110b can have any shape in the x-y plane. For example, the bumper assemblies 110a, 110b can have a shape in the x-y plane that is round, circular, triangular, rectangular, square, etc. In some examples, the bumper can have edges with sharp angles and/or small radii. In some examples, the bumper can have a shape in the x-y plane that approximates the shape of the vehicle body in the x-y plane. For example, edges of the bumper can conform to shapes of edges of the vehicle body.

FIG. 3A illustrates a perspective view of an example bumper assembly 310. The bumper assembly 310 includes multiple attachment points 330. The attachment points 330 are positioned to mount the bumper assembly 310 to a vehicle body, e.g., a frame 306 of the body 102. The bumper assembly 310 includes a plurality of flexible couplings 320 coupled to the attachment points 330. The flexible couplings 320 are configured to be attached to vehicle attachment points of the body 102 to mount the bumper assembly 310 to the body 102.

The vehicle 100 can include any appropriate number of flexible couplings 320. In the example of FIG. 1, the vehicle 100 includes four flexible couplings 320. The flexible couplings 320 are loaded in shear. Each flexible coupling 320 is in a neutral position in the horizontal planar direction, e.g., the x-y direction, when the bumper assembly 310 is not in horizontal planar deflection. When the bumper assembly 310 is in horizontal planar deflection, each flexible coupling 320 applies a restorative force that causes the bumper assembly 310 to force toward the neutral position.

The bumper assembly 310 is coupled to sensors 360a, 360b that detect horizontal deflection of the bumper assembly 310 relative to the frame 306 of the body 302. Although shown as having two sensors 360a, 360b, the bumper assembly 310 can be coupled to any appropriate number of sensors. For example, the bumper assembly 310 can be coupled to one sensor, three sensors, or four sensors.

Figure 3B:
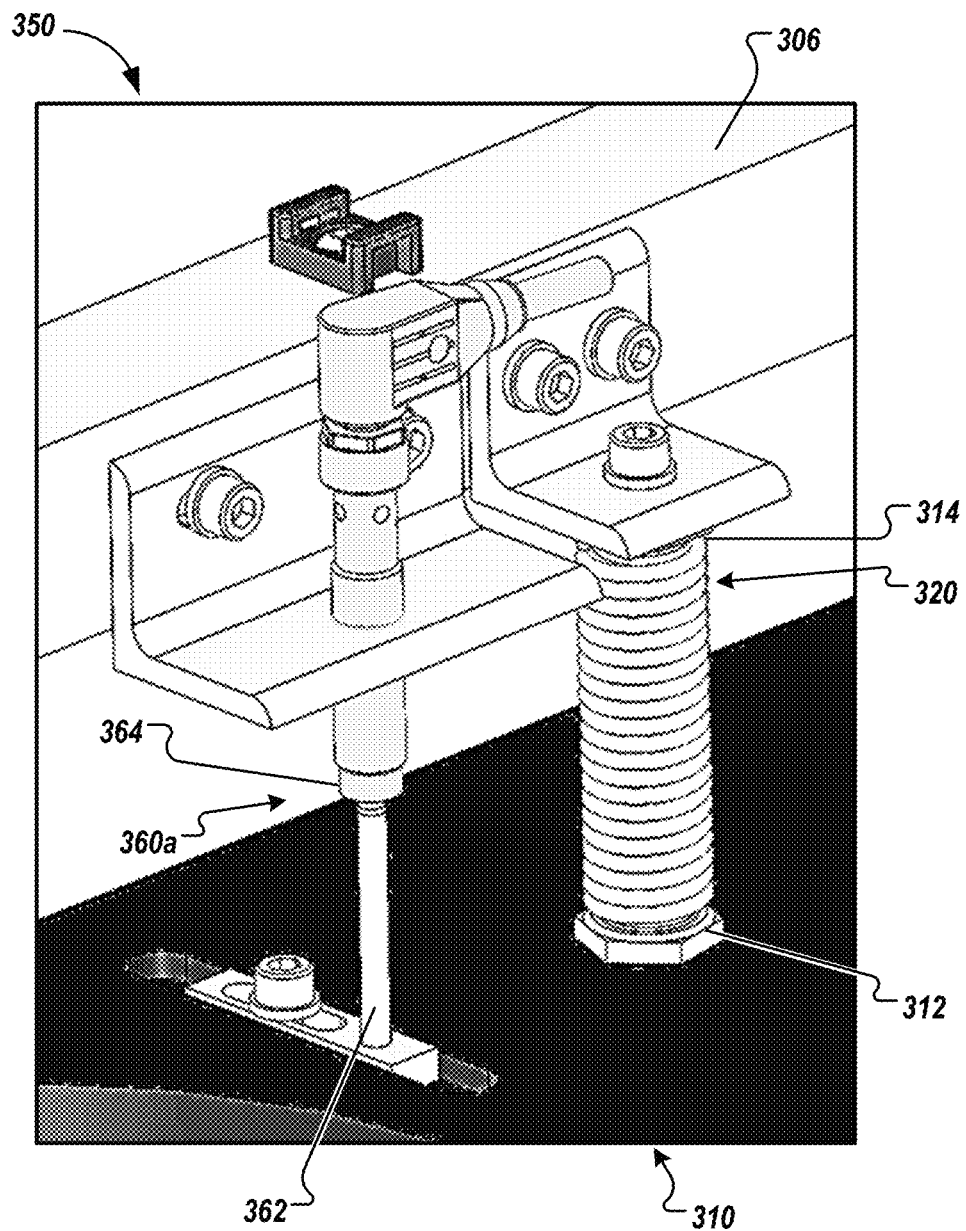
FIG. 3B illustrates a perspective view of an example sensor and an example coupling of the bumper assembly of FIG. 3A.

FIG. 3B shows an enlargement of section 350 of FIG. 3A. FIG. 3B illustrates a perspective view of an example sensor 360a and an example flexible coupling 320 of the bumper assembly 310 of FIG. 3A.

The flexible coupling 320 includes an extension spring. An axis of the extension spring 320 extends in the z-direction orthogonal to the horizontal direction. A first end 312 of the extension spring is coupled to the bumper assembly 310, and a second end 314 of the extension spring is coupled to the frame 306.

The bumper assembly 310 is coupled to sensors 360a. When the vehicle is moving in the horizontal direction, and the bumper assembly 310 impacts an obstacle, the sensor 360a detects the horizontal planar deflection of the bumper assembly relative to the vehicle body. The sensor 360a generates a signal indicating that the bumper assembly 310 has been displaced or deflected in the horizontal planar direction at least a threshold amount. The sensor 360a can detect any rotation or translation of the bumper assembly 310 in the horizontal plane. The sensor 360a outputs the signals to a drive system that is configured to propel the vehicle in the horizontal direction.

The sensor 360a includes a first portion 362 mounted to the bumper assembly 310 and a second portion 364 mounted to the frame 306. The first portion 362 is in operative disposition to the second portion 364 are in operative disposition. In some examples, the sensor 360a includes a proximity sensor. The first portion 362 of the proximity sensor includes a target that is mounted to the bumper assembly 310. The second portion 364 of the proximity sensor includes a sensing face that is mounted to the frame 306. When the target is not within a specified proximity to the sensing face, the proximity sensor generates the signals indicating the bumper assembly has deflected in the horizontal planar direction at least a threshold amount.

The sensor 360a can be calibrated such that the target is within the specified proximity to the sensing face when the bumper assembly is in a neutral position or is deflected less than the threshold amount. The sensor 360a can be calibrated such that the target is outside of the specified proximity to the sensing face when the bumper assembly is deflected in any direction greater than the threshold amount. The threshold amount of deflection of the bumper assembly can be, e.g., five millimeters, six millimeters, or eight millimeters. The threshold amount of deflection can be caused by impact of the bumper assembly with an obstacle, e.g., an impact that causes between approximately fifteen and twenty pounds of force.

In some examples, the target can include a pin such as a dowel pin mounted to the bumper assembly 310. In some examples, the pin can be a steel pin. The sensing face of the proximity sensor can be mounted to the frame 306 above the target. The sensing face of the proximity sensor can be configured to detect a proximity of ferromagnetic material. This allows the sensor to detect lateral movement of the bumper relative to the frame.

The flexible coupling 320 allows for some vertical deflection of the bumper assembly 310 relative to the frame 306. The flexible coupling 320 applies a restorative force to the bumper assembly 310 in the vertical direction. The restorative force causes the bumper assembly 310 to return to a neutral vertical position after a vertical deflection. The flexible coupling 320 can apply the restorative force in the vertical direction in order to maintain the target of the proximity sensor within vertical proximity to the sensing face during normal movement of the vehicle. For example, minor disturbances to motion of the vehicle can cause slight vertical displacement of the bumper assembly 310. The flexible coupling 320 can maintain the target within specified threshold proximity to the sensing face to prevent spurious interruptions of vehicle movement.

Figure 4A:
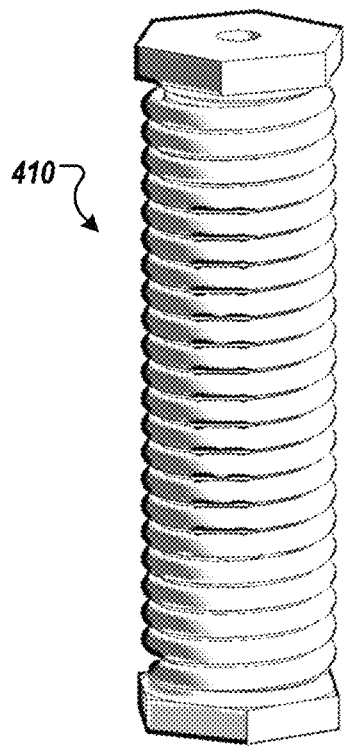
FIGS. 4A to 4D illustrate example components of coupling assemblies.

FIGS. 4A to 4D illustrate example components of coupling assemblies. FIG. 4A shows an example extension spring 410 that can be used in a flexible coupling assembly. The extension spring 410 can be formed from a metal material such as steel.

In some examples, the first end 312 of the extension spring 410 is coupled to the bumper assembly, and the second end 314 of the extension spring 410 is coupled to the frame. In some examples, such as the embodiment shown in FIG. 2A, the first end 312 of the extension spring 410 is coupled to a horizontal surface of the bumper assembly. In some examples, such as the embodiment shown in FIG. 2B, the first end 312 of the extension spring of the extension spring 410 is coupled to a vertical surface of the bumper assembly. The bumper assembly can be bolted to the frame of the vehicle body using the extension spring 410 to allow for lateral (horizontal) compliance. The extension spring also allows compliance axially to permit slight vertical displacement of the bumper assembly relative to the frame.

Figure 4B:
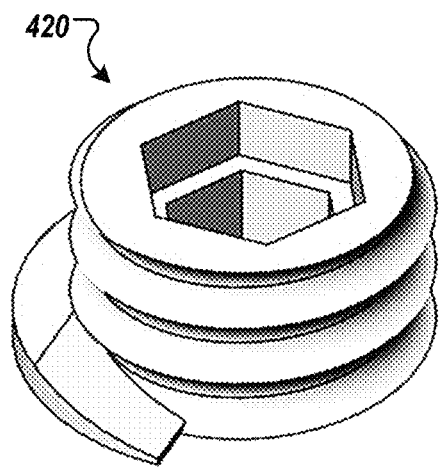

The extension spring 410 can be coupled to the bumper assembly, to the frame, or both, by a threaded plug 420, shown in FIG. 4B. The threaded plug 420 includes male threads to mate with the inside of the extension spring 410, with a nominal clearance of approximately 0.5 mm between the extension spring 410 and the threaded plug 420. The threaded plug 420 also featured a hexagonal hole to capture a metal nut, and a hexagonal hole to enable tightening the plug onto the extension spring 410 with a standard Allen key.

Figure 4C:
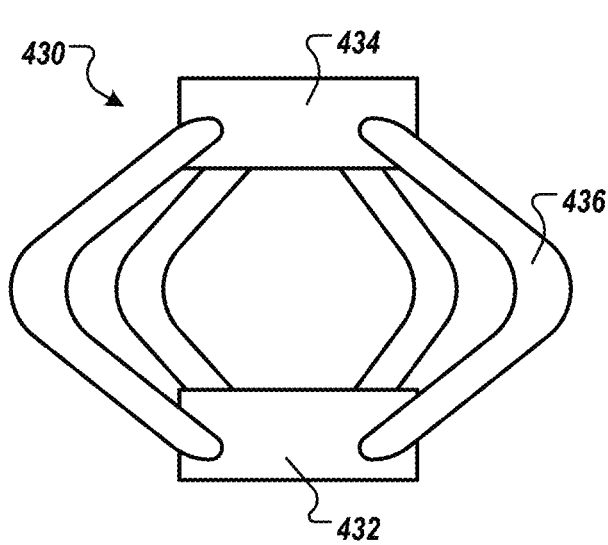

Referring to FIG. 4C, in some examples, a coupling assembly can include a wire rope isolator 430. The wire rope isolator can be used as a multi-directional spring to and mounts the bumper assembly to the frame of the vehicle body.

The wire rope isolator 430 includes a first attachment plate 432 and a second attachment plate 434. The first attachment plate 432 can be coupled to the bumper assembly 310 and the second attachment plate 434 can be coupled to the frame 306 of the body. The first attachment 432 and the second attachment plate 434 can be attached to the bumper assembly and to the body using bolts.

Figure 4D:
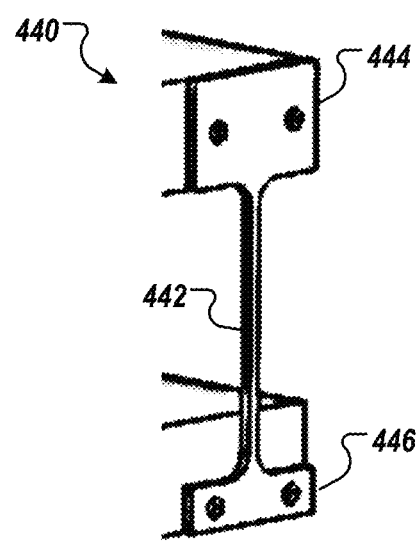

FIG. 4D shows an example cantilever beam 440 that can be used in a flexible coupling assembly. The cantilever beam 440 can include a rod such as a Delrin rod. In some examples, the Delrin rod has a diameter of 3/16 inches. The cantilever beam can function as a leaf spring coupling the bumper assembly to the frame. The cantilever beam can be mounted to the bumper assembly and to the frame using bolts, screws, or loop clamps. The cantilever beam includes a thinner center section 442 and wider end sections 444, 446.

Figure 5:
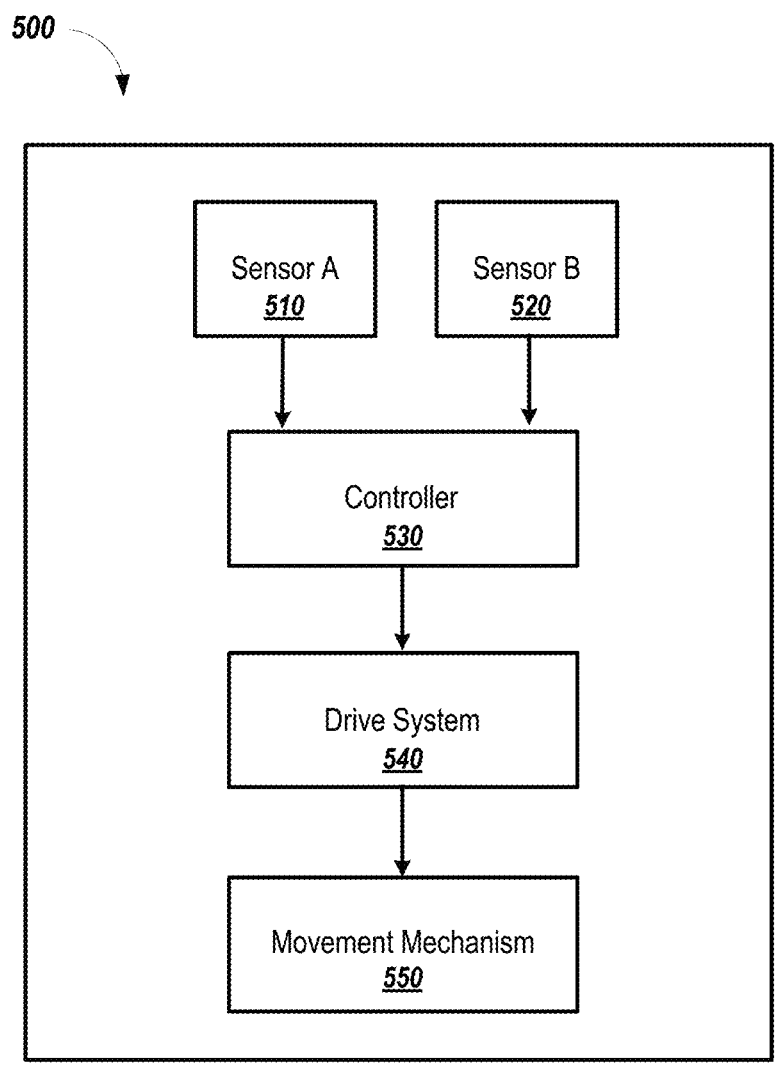
FIG. 5 is a block diagram of an example ground vehicle system.

FIG. 5 is a block diagram of an example ground vehicle system 500. The ground vehicle system 500 includes two sensors, sensor 510 and sensor 520. The ground vehicle system 500 includes a controller 530, drive system 540, and movement mechanisms 550. The movement mechanisms can include, for example, one or more wheels or treads.

The sensors 510, 520 can be, for example, proximity sensors. When the sensors 510, 520 detect that the proximity target is not within the specified threshold proximity, the sensors 510, 520 output a signal to the controller 530. In some examples, the sensors 510, 520 each output a binary signal. For example, the sensors 510, 520 can each output a value of "one" when the target is within the specified threshold proximity to the sensing face, and a value of "zero" when the target is not within the specified threshold proximity to the sensing face.

The signal output by the sensors 520, 520 indicates that the bumper assembly has deflected greater than a threshold amount. In response to receiving the signal, the controller 530 controls the drive system 540 of the vehicle to cause the vehicle to stop moving in the horizontal planar direction. For example, the drive system 540 can cause the vehicle to stop moving by ceasing to apply a motive force to the movement mechanisms 550 and/or by applying a brake to the movement mechanisms 550.

In some examples, the controller 530 controls the drive system 540 to stop the vehicle in response to receiving a signal from at least one of the sensors 510, 520. In some examples, the controller 530 controls the drive system 540 to stop the vehicle in response to receiving signals from both of the sensors 510, 520. For example, the controller 530 can apply coincidence logic that requires signals from both of the sensors 510 before stopping the vehicle.

The vehicle system 500 can include any number of sensors, e.g., one sensor, three sensors, or four sensors. The controller 530 can be configured to stop the vehicle in response to receiving signals from, e.g., one out of one sensor, one out of two sensors, two out of two sensors, two out of three sensors, two out of four sensors, three out of four sensors, etc.

In some examples, accelerations and decelerations can cause deflections of the bumper assembly and can result in false positive collision detections. To reduce the likelihood of false positive collision detections, the controller 530 can mute the sensors 510, 520 during accelerations and decelerations of the vehicle system 500. In some examples, the controller 530 can mute the sensors 510 by ignoring signals from the sensors 510, 520 received during movement of the vehicle that is greater than a threshold acceleration or greater than a threshold deceleration.

Embodiments of the subject matter and the operations described in this specification can be implemented, in party, by digital electronic circuitry, or in computer software, firmware, or hardware, including the structures disclosed in this specification and their structural equivalents, or in combinations of one or more of them, in additional to the structures described above.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A vehicle comprising:
 a body having a first outer periphery in a first plane that is parallel to a surface on which the vehicle moves in a horizontal direction;

a bumper assembly having a second outer periphery in a second plane parallel to the first plane, the second outer periphery including portions that extend beyond the first outer periphery in the horizontal direction;

one or more flexible couplings coupling the bumper assembly to the body, the one or more flexible couplings allowing for horizontal planar deflection of the bumper assembly relative to the body when the bumper assembly impacts an obstacle when the vehicle is moving in the horizontal direction, each of the one or more flexible couplings comprising an extension spring, an axis in which the extension spring compresses extending in a direction orthogonal to the horizontal direction when the extension spring is in a neutral position, with a first end of the extension spring being coupled to the bumper assembly and a second end of the extension spring being coupled to the body, wherein, when the bumper assembly is in horizontal planar deflection, the extension spring provides restorative force in the horizontal direction;

one or more sensors mounted relative to the bumper assembly and to the body to detect horizontal planar deflection of the bumper assembly, the one or more sensors being configured to generate signals indicating the bumper assembly has deflected in the horizontal planar direction at least a threshold amount; and a drive system configured to propel the vehicle in the horizontal direction and that receives, as input, the signals generated by the one or more sensors and in response to the signals indicating the bumper assembly has deflected in the horizontal planar direction at least a threshold amount, causes the vehicle to stop moving in the horizontal planar direction.

2. The vehicle of claim 1, wherein the one or more sensors each comprise a proximity sensor.

3. The vehicle of claim 2, wherein:
a sensing face of the proximity sensor is mounted to the body; and
a target of the proximity sensor is mounted to the bumper assembly so that the sensing face and target are in operative disposition from each other.

4. The vehicle of claim 3, wherein when the target is not within a specified proximity to the sensing face, the proximity sensor generates the signals indicating the bumper assembly has deflected in the horizontal planar direction at least a threshold amount.

5. The vehicle of claim 1, wherein each of the one or more flexible couplings are in the neutral position when the bumper assembly is not in horizontal planar deflection, and the restorative force causes the bumper assembly to force toward the neutral position.

6. The vehicle of claim 1, wherein the one or more flexible couplings allows for vertical deflection of the bumper assembly relative to the body.

7. The vehicle of claim 6, wherein the one or more flexible couplings each apply a restorative force to the bumper assembly in the vertical direction, the restorative force causing the bumper assembly to return to a neutral vertical position after a vertical deflection.

8. The vehicle of claim 1, wherein the first end of the extension spring is coupled to a horizontal surface of the bumper assembly by a threaded plug.

9. The vehicle of claim 1, wherein the vehicle comprises an autonomous ground vehicle.

10. A bumper system for a vehicle, comprising:
a bumper assembly having a first outer periphery in a first horizontal plane;
a plurality of attachment points on the bumper assembly that are positioned to mount the bumper assembly to a vehicle body having a second outer periphery in a second horizontal plane that is parallel to the first horizontal plane, wherein the second horizontal plane is parallel to a surface on which the vehicle moves in a horizontal direction; and
a plurality of flexible couplings that are coupled to the attachment points and are configured to be attached to vehicle attachment points of the vehicle body to mount the bumper assembly to the vehicle body and allow for horizontal planar deflection of the bumper assembly relative to the vehicle body when the bumper assembly impacts an obstacle when the vehicle body is moving in the horizontal direction, wherein:
each of the plurality of flexible couplings comprises an extension spring, an axis in which the extension spring compresses extending in a direction orthogonal to the horizontal direction when the extension spring is in a neutral position, with a first end of the extension spring being coupled to the bumper assembly and a second end of the extension spring being coupled to the vehicle body,
when the bumper assembly is in horizontal planar deflection, the extension spring provides restorative force in the horizontal direction, and
the first outer periphery of the bumper assembly, when the bumper assembly is attached to the vehicle body by the flexible couplings, includes portions that extend beyond the second outer periphery in the horizontal direction.

11. The bumper system of claim 10, comprising:
one or more sensors comprising a first portion mounted to the bumper assembly and a second portion mounted to the vehicle body in operative disposition to the first portion, the one or more sensors being configured to detect horizontal planar deflection of the bumper assembly relative to the vehicle body when the bumper assembly impacts an obstacle when the vehicle is moving in the horizontal planar direction and to generate signals indicating the bumper assembly has deflected in the horizontal planar direction at least a threshold amount; and
a controller configured to receive, as input, the signals generated by the one or more sensors and in response to the signals indicating the bumper assembly has deflected in the horizontal planar direction, control a drive system of the vehicle to cause the vehicle to stop moving in the horizontal planar direction.

12. The bumper system of claim 11, wherein the one or more sensors each comprise a proximity sensor.

13. The bumper system of claim 12, wherein:
the second portion of each of the one or more proximity sensors comprises a sensing face mounted to the vehicle body; and
the first portion of each of the one or more proximity sensors comprises a target mounted to the bumper assembly so that the sensing face and the target are in operative disposition to each other.

14. The bumper system of claim 13, wherein when the target is not within a specified proximity to the sensing face, the proximity sensor generates the signals indicating the bumper assembly has deflected in the horizontal planar direction at least a threshold amount.

15. The bumper system of claim 11, wherein the plurality of flexible couplings are in the neutral position when the bumper assembly is not in horizontal planar deflection, and the restorative force causes the bumper assembly to force toward the neutral position.

16. The bumper system of claim 11, wherein the plurality of flexible couplings allow for vertical deflection of the bumper assembly relative to the body.

17. The bumper system of claim 16, wherein the one or more flexible couplings each apply a restorative force to the bumper assembly in the vertical direction, the restorative force causing the bumper to return to a neutral vertical position after a vertical deflection.

\* \* \* \* \*